United States Patent [19]

Gattrugeri

[11] Patent Number: 5,297,875
[45] Date of Patent: Mar. 29, 1994

[54] HEAD STRUCTURE FOR ROTATABLY SUPPORTING SHAFTS

[76] Inventor: Giovanni Gattrugeri, Viale Famagosta 38, 20142 Milan, Italy

[21] Appl. No.: 31,986
[22] Filed: Mar. 16, 1993
[30] Foreign Application Priority Data Mar. 24, 1992 [IT] Italy .............. MI92A000693

[51] Int. Cl.⁵ .................. F16C 13/02; F16C 43/04
[52] U.S. Cl. .................. 384/419; 384/537; 384/546
[58] Field of Search ............ 384/418, 419, 537, 546, 384/585

[56] References Cited

U.S. PATENT DOCUMENTS

| | | | |
|---|---|---|---|
| 1,964,766 | 7/1934 | Miller | 384/419 X |
| 2,602,711 | 7/1952 | Imshaug | 384/537 |
| 2,711,937 | 6/1955 | Pollock | 384/546 |
| 4,897,986 | 2/1990 | Baker et al. | 384/537 X |

FOREIGN PATENT DOCUMENTS 1268443 5/1968 Fed. Rep. of Germany.
1525175 6/1969 Fed. Rep. of Germany.

Primary Examiner—Thomas R. Hannon
Attorney, Agent, or Firm—Guido Modiano; Albert Josif; Daniel O'Byrne

[57] ABSTRACT

Head structure for rotatably supporting shafts and the like, including fixed head bodies, each of which defines a seat for the accommodation of bearings which are connected to the shaft to be supported and which defines an axial cavity which rotatably accommodates a pin which can be removably coupled to an end of the shaft so that it rotates rigidly therewith. Each head body has a slider-like portion which can be moved to access the seats in a radial direction.

7 Claims, 2 Drawing Sheets

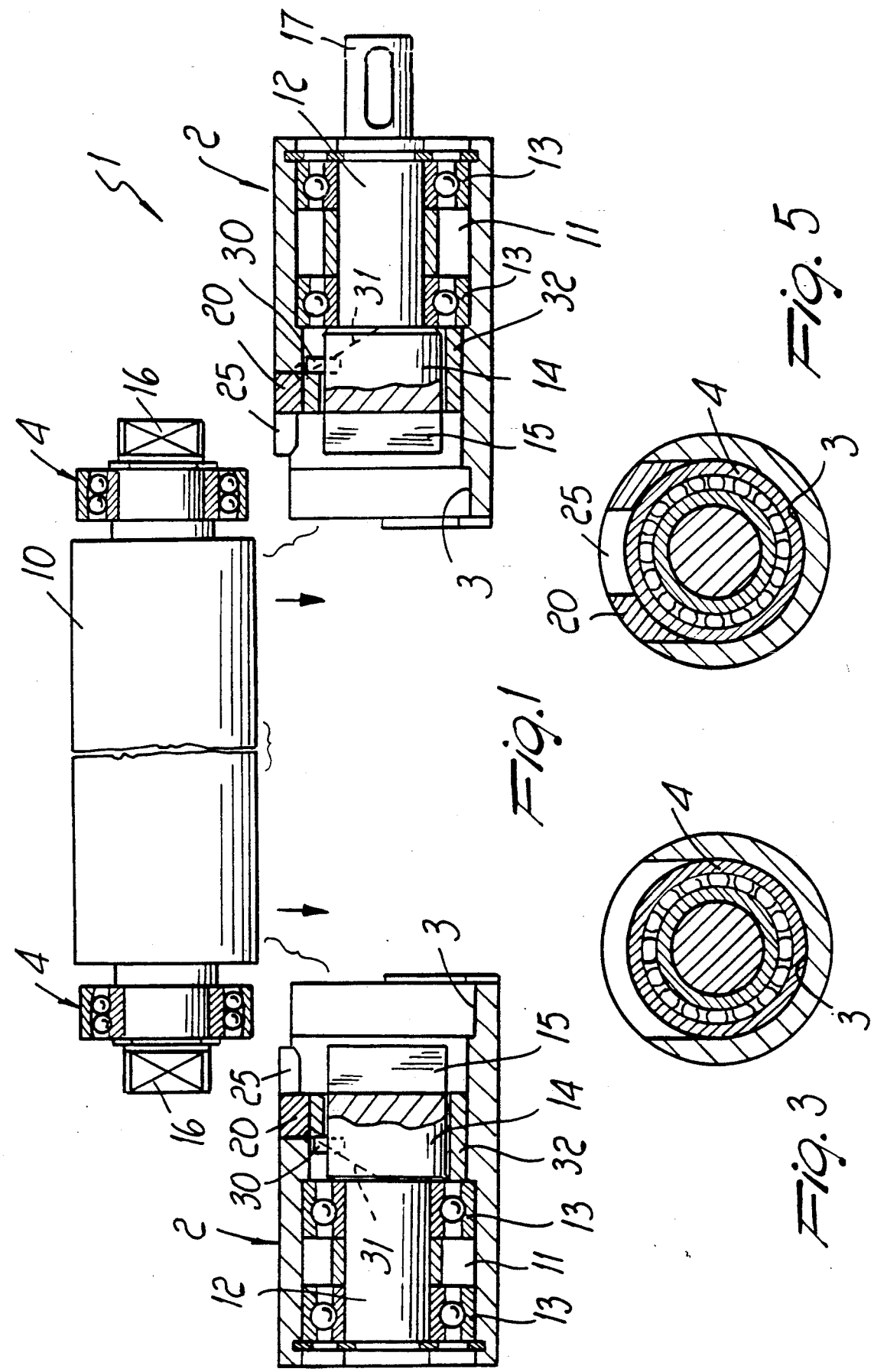

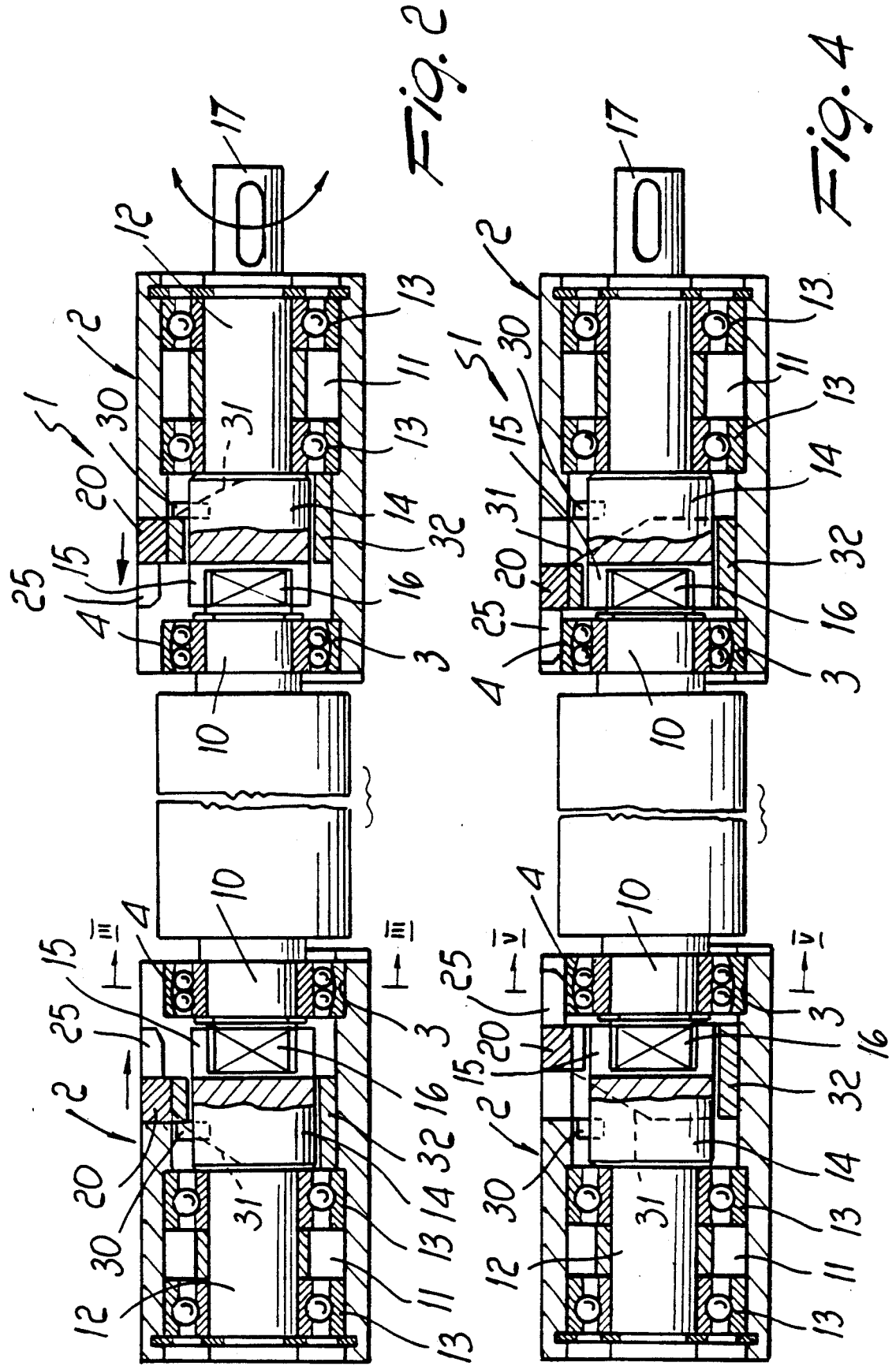

HEAD STRUCTURE FOR ROTATABLY SUPPORTING SHAFTS

BACKGROUND OF THE INVENTION

The present invention relates to a head structure for rotatably supporting shafts and the like.

As is known, in many industrial fields it is necessary to provide for the rotary support of shafts with the possibility of easily removing the shaft from its support. In particular, the paper-making industry and similar industries use supporting shafts for paper rolls, which are normally very heavy and large.

Said rolls must be rotated at very high speeds, so that it is absolutely necessary to have a perfect centering of the shaft with respect to the rotation axis, in order to avoid dangerous vibrations or imbalances.

In order to support the shaft, current solutions use supporting heads, to which the shaft is connected, which are mounted so that they can rotate with respect to the fixed structure. The motor means for turning or braking the roll, depending on whether the paper is being rolled or unrolled, are furthermore connected to the heads.

With the solutions of the known art, it is virtually impossible to perfectly center the shaft with respect to the supports, and it is necessary to resort to couplings which must be performed with great care and precision so as to center the shaft. Furthermore, in order to mutually couple the head and the end of the shaft it is necessary to perform complicated operations, so as to provide, at the end of the shaft, a partially open seat in which said shaft end can be inserted.

Currently, with the above described solutions, there are considerable problems both for the machining of the shafts, which must be extremely accurate and precise, and for the application of the shafts to the supporting heads which, by rotating with respect to a fixed supporting structure, introduce further rotating masses whose perfect centering with respect to the rotation axis is often troublesome.

SUMMARY OF THE INVENTION

The aim of the present invention is indeed to eliminate the problems described above by providing a head structure for rotatably supporting shafts and the like which allows to radically modify the conventional concepts of coupling between the shaft and the head, considerably simplifying all coupling operations while always having the assurance that the shaft rotates in perfect axial alignment with respect to its supporting element.

Within the scope of the above aim, a particular object of the invention is to provide a head structure wherein the rotary motion or the braking action is transmitted to the shaft or imparted thereto not on the head but directly on the shaft inside the head, consequently simplifying all the steps of execution.

Another object of the present invention is to provide a head structure wherein the application of the shaft to the head is simplified and does not require particular solutions in operation.

Another object of the present invention is to provide a head structure which, by virtue of its particular constructive characteristics, is capable of always giving the greatest assurances of reliability and safety in use.

A further object of the present invention is to provide a head structure which can be easily obtained starting from commonly commercially available elements and materials and is furthermore advantageous from an economic point of view.

This aim, the objects mentioned and others which will become apparent hereinafter are achieved by a head structure for rotatably supporting shafts and the like, characterized in that it comprises fixed head bodies, each of which defines a seat for the accommodation of bearings which are connected to the shaft to be supported, and which defines an axial cavity which rotatably accommodates a pin which can be removably coupled to an end of said shaft so that it rotates rigidly therewith, each head body having a sliderlike portion which can be moved to access said seats in a radial direction.

BRIEF DESCRIPTION OF THE DRAWINGS

Further characteristics and advantages of the present invention will become apparent from the following detailed description of a preferred but not exclusive embodiment of a head structure for rotatably supporting shafts and the like, illustrated only by way of non-limitative example in the accompanying drawings, wherein:

FIG. 1 is a sectional view of the head structure according to the invention, with the shaft spaced from the head bodies;

FIG. 2 is a sectional view of the head during the coupling between the shaft and the head bodies;

FIG. 3 is a sectional view, taken along the plane III—III of FIG. 2;

FIG. 4 is a sectional view of the head according to the invention, with the head bodies coupled to said shaft;

FIG. 5 is a sectional view, taken along the plane V—V of FIG. 4.

DESCRIPTION OF THE PREFERRED EMBODIMENTS

With reference to the above figures, the head structure for rotatably supporting shafts and the like, according to the invention, which is generally designated by the reference numeral 1, comprises two head bodies, designated by the reference numeral 2, which are arranged so that they are mutually axially aligned and opposite.

Each head body has, at its mutually facing ends, a seat 3 in which a bearing 4 can be accommodated; said bearing can be of the oscillating type and is fitted at the ends of a shaft which is generally designated by the reference numeral 10.

The bearing can be replaced with other equivalent elements having a spherical seat which allow a limited flexing of the shaft due to the weight of the roll.

Each head body furthermore has, inside it, a cavity 11 in which pins 12 are rotatably supported by means of the interposition of bearings 13: each of the pins has at their mutually facing ends, an expansion 14 which is provided with a region 15 for coupling to the shaped end 16 of the shaft so as to rigidly rotationally couple the shaft 10 to the respective pin 12.

Advantageously, according to a preferred but not exclusive embodiment, the shaped end 16 has two opposite flat surfaces which enter the coupling region 15, which is constituted in practice by a diametrical groove which allows to rigidly rotationally couple the shaft to the pins.

A protruding tang 17 is connected to one of the pins for connection to conventional motor means for driving the pins and the shaft or to the braking means for braking such pins and shaft.

Each head body is connected to a fixed structure and is consequently fixed, whereas the only rotating part is constituted by the pins 12 and by the shaft 10 which connects to the heads by means of the oscillating bearings 4, which are directly keyed to said shaft and are thus perfectly centered on the shaft.

For coupling there is a slider 20 which is slidably associated with the head in a direction parallel to the longitudinal extension of the rotation axis of the head, and in practice affects a circumferential portion of the head which is such as to allow the insertion of the bearings 4, which occurs in a radial direction.

As shown in FIGS. 1-2, when the sliders are in spaced position it is possible to insert the shaft 10 in a radial direction with respect to the head bodies, accommodating the bearings 4 in the respective seats 3.

The slider is then made to slide axially so as to circumferentially close the seat 3.

The sliding of the slider can be performed either manually, or by means of pistons or, possibly, automatically by the rotation of the pins 12 by means of a radial dowel 30 which engages on an inclined-plane portion 31 defined on a sleeve 32 which is coaxial to the expansion 14 and is rigidly coupled to the slider 20.

For the sake of completeness in description, it should also be added that the slider 20 has, proximate to its free end, a recess 25 which allows the shaped portion 16 of the shaft to pass radially with respect to the axis of the head bodies.

From what has been described above it can thus be seen that the invention achieves the intended aim and objects, and in particular the fact is stressed that with the head according to the invention the head bodies are fixed and the rotation of the shaft is obtained by virtue of the fact that the shaft is provided with a bearing which engages the fixed head, whereas rotation is imparted by a pin which is rotatably supported by the head and does not require particularly accurate machining, since the perfect balanced rotation of the shaft is entrusted to the oscillating bearings 4 which are already directly provided on the shaft itself.

The invention thus conceived is susceptible to numerous modifications and variations, all of which are within the scope of the inventive concept.

All the details may furthermore be replaced with other technically equivalent elements.

In practice, the materials employed, as well as the contingent shapes and dimensions, may be any according to the requirements.

I claim:

1. Head structure for rotatably supporting shafts, comprising:
    a pair of fixed head bodies (2) each of which defines a partially open seat (3) for removably accommodating bearing elements (4) connected to opposite ends of a shaft (10) to be supported;
    a pin element (12) rotatably supported in an axial cavity (11) of one of said head bodies, said pin element having a first end (17) for connection to means for driving the pin and a second end (15) for connection to an end (16) of the shaft; and
    a slider-like portion (20) for each of said fixed head bodies and slidably connected thereto, said slider-like portion being slidably moveable between an open position in which said seat (3) is able to receive the bearing elements (4) of the shaft and a closed position in which said slider-like portion closes said seat so that said bearing elements are supported by said seat and by said slider-like portion.

2. Head structure according to claim 1, wherein said end (16) of said shaft is shaped with two flat surfaces and said second end (15) of said pin element is provided with a groove in which said end (16) of said shaft is removably accommodated.

3. Head structure according to claim 1, wherein said seat (3) and said slider-like portion (20) each have a semicircular cross-section.

4. Head structure according to claim 1, wherein said pin element is rotatably supported in a first one of said head bodies and a second one of said head bodies freely rotatably supports a pin having an end for connection to a second end of the shaft.

5. Head structure according to claim 1, wherein said first end of said pin element comprises a tang (17) which protrudes from said one of said head bodies.

6. Head structure according to claim 1, further comprising means for automatically closing said slider-like portion into said closed position upon rotation of said pin element by said means for driving.

7. Head structure according to claim 6, wherein said means for automatically closing said slider-like portion comprise a sleeve (32) which is rigidly coupled to said slider-like portion and which is provided with a inclined-plane portion (31) for slidably engagement with fixed element (30).

* * * * *